UNITED STATES PATENT OFFICE.

THOS. C. PROSSER, OF BAY CITY, MICHIGAN.

IMPROVEMENT IN MAKING BRICKS.

Specification forming part of Letters Patent No. 56,608, dated July 24, 1866.

*To all whom it may concern:*

Be it known that I, THOMAS CHEVALIER PROSSER, of the city of Bay City, in Bay county, in the State of Michigan, have invented a new and Improved Way of Making Bricks with which to build houses and similar structures, and for such purposes generally as ordinary bricks are applied to or used for; and I do declare that the following is a full and exact description thereof.

For making such bricks, ordinarily I, take one part of hydraulic lime and one part of common slaked lime and three to seven parts of sand, and mix the whole together in a rough manner; then, having moistened the mixed material with water in sufficient quantity, I put the material into boxes or molds of suitable sizes to set. After said material is set I take the same out of the boxes or molds and let it dry by exposure to the air. The brick when thoroughly dry is fit for the uses and purposes hereinbefore set forth. Or I take a less quantity of sand and substitute therefor crushed quartz or other stone or gravel, and put the material, mixed and properly moistened, into the boxes or molds and treat them as hereinbefore mentioned; or I vary the quantities of hydraulic lime and common lime, and sometimes omit the common lime altogether, according to the resistance against the crushing power required in the bricks.

What I claim as my invention, and desire to secure by Letters Patent, is—

The forming of the materials (in which hydraulic lime is always one of them) proportioned or varied as above into separate and individual bricks, as described, to be used for and applied to the purposes hereinbefore set forth.

T. C. PROSSER.

Witnesses:
 WILLIAM HASTE,
 J. W. PROSSER.